Patented Dec. 29, 1925.

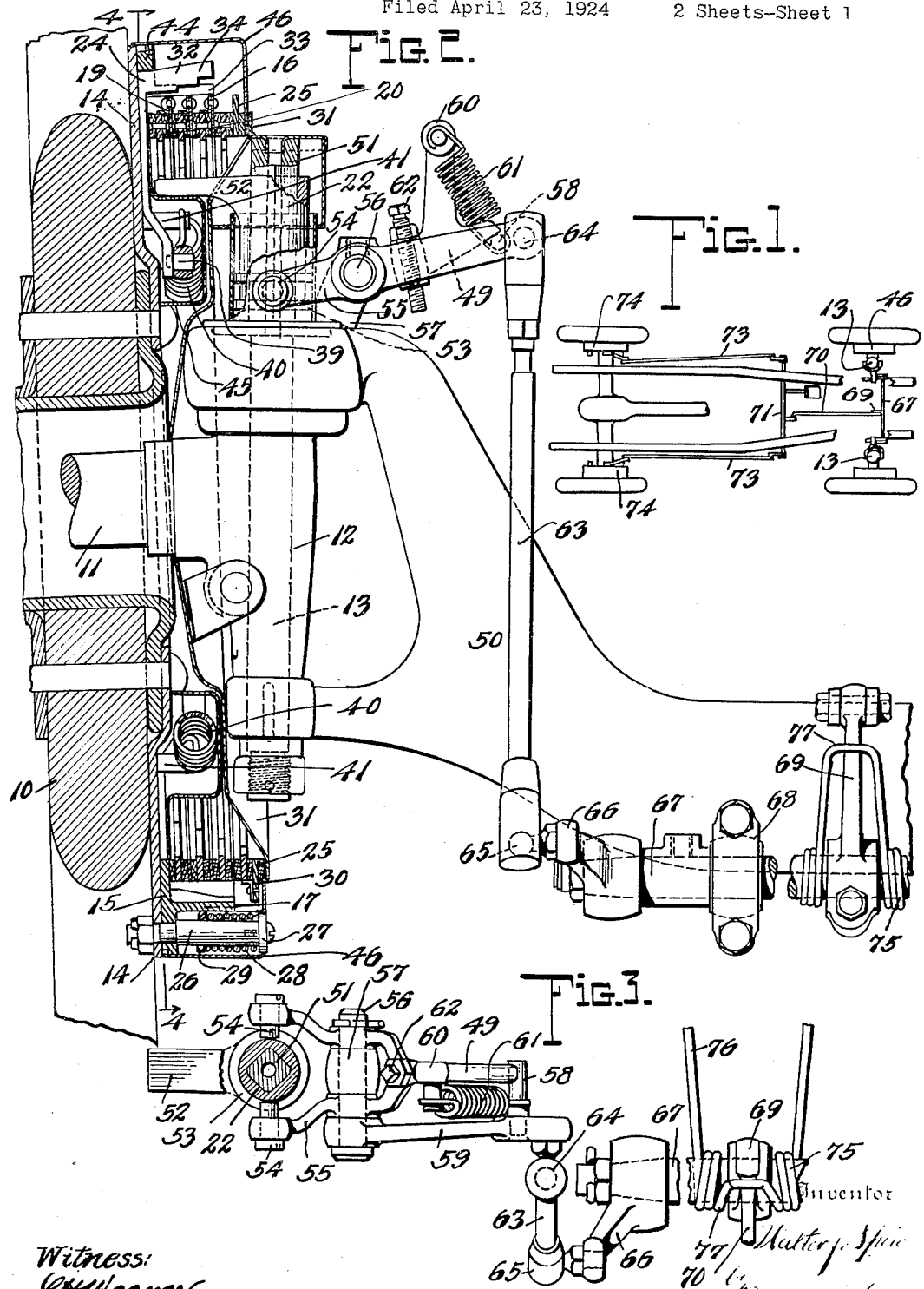

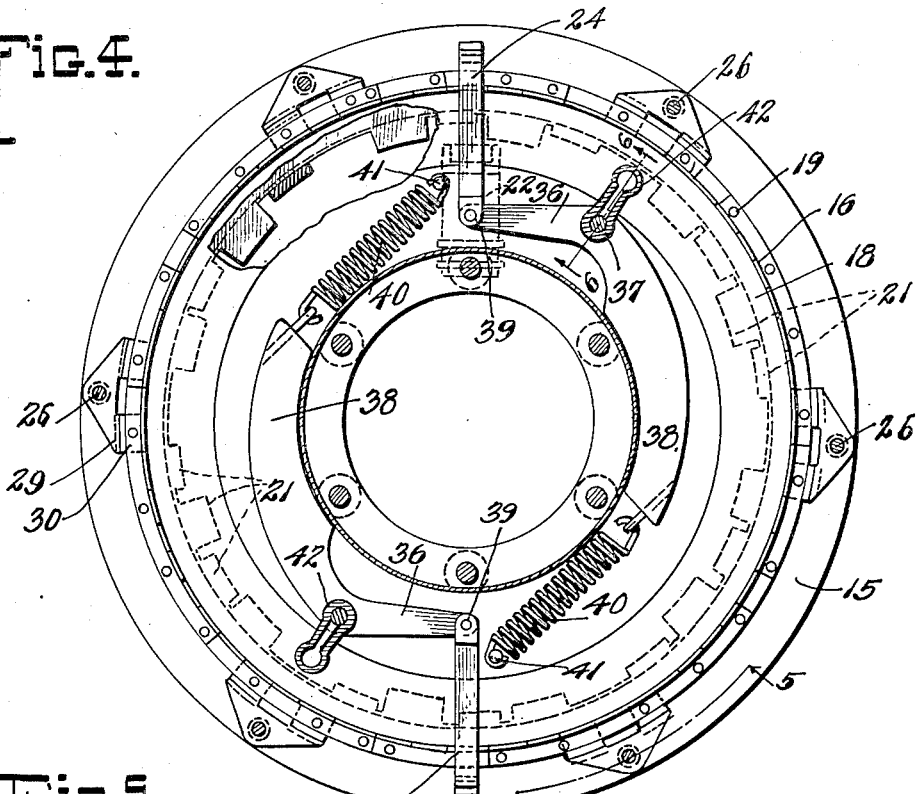

1,567,174

UNITED STATES PATENT OFFICE.

WALTER J. SPIRO, OF WHITE PLAINS, NEW YORK.

AUTOMATIC BRAKE CONTROL.

Application filed April 23, 1924. Serial No. 708,449.

*To all whom it may concern:*

Be it known that I, WALTER J. SPIRO, citizen of the United States, residing at White Plains, in the county of Westchester and State of New York, have invented certain new and useful Improvements in Automatic Brake Controls, of which the following is a specification.

This invention relates to an automatic brake control and particularly to a construction adapted for application in a four wheel braking system for motor vehicles.

In prior constructions of this character the application of the brakes to the front wheels when reducing the speed for stopping or turning had a tendency to lock the wheels causing skidding and preventing free steering movement thereof which often resulted in ditching or overturning the vehicle. To overcome such objections it is essential that the brakes be released when the rotation of the wheel reaches substantially zero. It is therefore desirable to automatically release the front wheel brakes when the speed is materially reduced for either stopping or turning purposes while leaving the rear wheel brakes in full operative condition. Such an arrangement renders the steering wheels free as their rotation is reduced to practically a stopping point and automatically reconnects them as the speed of rotation is restored.

The invention has for an object to provide a novel and improved four wheel braking system embodying a manually operable braking member at each wheel and speed responsive means for connecting and disconnecting the front wheel brakes to render them inoperative when the speed is reduced below a predetermined rate.

Another object of the invention is to provide an improved construction independent of the brake operating means by which the brake is automatically locked to the wheel or released therefrom relative to the speed of rotation of the wheel.

A further object of the invention is to present a new structure of locking means between the brake and wheel comprising a movable member upon the wheel to engage the brake and automatically operated by centrifugal force in its movements toward and from the brake.

A still further object of the invention is to provide a novel construction of friction brake comprising parallel series of rings, one series being automatically engaged and disengaged from the wheel responsive to the speed of rotation thereof, and the other series being normally rotatable with the driven rings but adapted to be held against such rotation by a brake actuator under control of the operator.

Other and further objects and advantages of the invention will be hereinafter set forth and the novel features thereof defined by the appended claims.

In the drawings—

Figure 1 is a diagram of the invention applied to a four wheel braking system;

Figure 2 is a vertical section through a wheel and brake;

Figure 3 is a top plan of the brake actuating connections, with the post in section;

Figure 4 is a section on approximately the line 4—4 of Figure 2;

Figure 5 is a similar view on line 5—5 of Figure 4;

Figure 6 is a section on line 6—6 of Figure 4;

Figure 7 is an enlarged section of the upper portion of Figure 2;

Figure 8 is a detail elevation of the locked ring; and

Figures 9 and 10 similar views of the relatively movable rings.

Like numerals refer to like parts in the several figures of the drawings.

The invention has been disclosed as applied to a four wheel braking system for which it is particularly designed, but it is equally applicable to other uses and not limited to a vehicle brake.

The numeral 10 designates the wheel or driven member mounted upon the usual stub axle 11 having a bearing 12 through which the king pin 13 extends. This wheel carries a plate 14 from which the drum 15 carrying the brake members is supported. The form of brake herein shown comprises two series of friction rings, the rings 16 being adapted to be connected to and disconnected from the wheel and supported at their periphery by the wall 17 of the drum. Intermediate of the rings 16 the rings 18 of less diameter are disposed and held against diametric movement by the angle brackets 19 secured at the outer periphery of the rings 16. The rings 18 may be provided upon their opposite faces with brake shoes 20, and at their inner periphery are formed with lugs 21 to cooperate with a brake actuator 22. These lugs upon the different rings vary in the length of their inward projection so that they will be successively engaged by the actuator in the rotation of the wheel until all of the lugs are brought into lateral alinement when the brake is fully applied. This provides for a graduated application of the brake and the control thereof by an actuator reciprocating diametrically of the braking rings.

The braking rings 16 are formed with recessed portions 23 upon their outer periphery to cooperate with a locking member 24 which reciprocates relative to the axis of the rings. The edge of the rings intermediate these recesses is braced by the brackets 19 secured thereto. The two series of braking rings are held in frictional contact by a pressure plate 25 from which an angular portion 29 extends and is disposed over a post 26 secured to the drum. A coiled spring 28 surrounding this post bears upon the portion 29 and is retained in position by the screw held plate 27 to maintain a braking tension upon the rings which may be adjusted as desired. The plate 25 may be provided with supporting brackets 30 for the outer rings 18, and the pressure plates are disposed at proper intervals about the rings as shown in Figure 4. The rings just described are enclosed by a dust casing 31 carried by the lug 47 from the bearing 12.

The locking member 24 is preferably formed with an angle arm 32 adapted to operate through an aperture 33 in the drum flange or wall 17 and formed with a stepped contact face 34 to successively engage the peripheral flanges of the several rings 16 and bring the same into transverse alinement when the brake is fully locked to the wheel. This provides for a positive locking action and prevents injury to the parts by the arm being forced into contact with the flanges when out of alined position.

The locking member is actuated automatically by speed responsive means, one form of which is herein shown as comprising the lever 36 pivoted upon a post 37 from the plate 14 and having a weighted end 38 adapted to be projected centrifugally outward as the speed of rotation of the wheel increases. The opposite end of this lever is pivoted at 39 to the member 24. In order to quickly restore the parts to unlocked position as the speed is reduced, a tension spring 40 extends from the weighted end 38 to a fixed point at 41. The locking members are duplicated at diametrically opposite points on the wheel. As shown in Figure 6, the bearing for the lever 36 is formed with an extension 42 having a lubricating channel therein communicating with the post 37 and with an aperture 43 in the supporting plate at which a grease cup or other lubricating device may be applied. The releasing travel of the locking member may be limited by a stop 44, as shown in Figure 2, if found desirable. The speed responsive means may be enclosed in a protecting casing 45 of substantially annular shape, while the outer periphery of the brake is enclosed by a similar casing 46.

The novel form of brake actuator herein disclosed is mounted upon the king pin 13 carried by the main axle 50 which also supports the other connections to permit free steering movement of the wheels. The actuator 22 is slidingly supported upon an angular standard 51 secured to the king pin and provided with a lateral contact arm 52 to engage the lugs upon the series of braking rings. The actuator is formed at its base with a dwell collar 53 which receives the opposite pins 54 from the yoke 55 pivoted upon the shaft 56 mounted in a pivoting lug 57 from the axle 50. This yoke is formed with a finger 49 projected to engage a pin 58 carried by an arm 59 pivoted upon the shaft 56. The yoke is also provided with an angularly disposed standard 60 from which a spring 61 extends to the pin 58 to normally retain the yoke finger in contact with said pin while permitting a yielding separation of these members when the actuator arm is forced into contact with the rings. The extent of such movement and the downward travel of the yoke is adjustably determined by a set screw 62 mounted in the yoke and adapted to engage the axle in the braking action.

For the purpose of maintaining the operating connections in the different positions of the steering wheels, a rod 63 is pivoted at one end 64 in the arm 59 and at its opposite end connected by a knuckle joint 65 with a crank 66 upon a shaft 67 supported from the axle at 68. This shaft also carries a lever 69 from which the brake operating means 70 extend to the usual brake shaft 71 carrying the pedal 72 and from which the rods 73 extend to actuate the rear wheel brakes 74, as indicated in Figure 1. The members controlled by the shaft 67 are normally tensioned in release position by a spring 75 encircling the shaft with its ends 76 disposed beneath the axle and its looped portion 77 engaging the lever 69. This construction provides for movement from the brake rod 70 through the rock shaft 67 to the rod 63 which operates the yoke to lift the actuator by a reciprocating movement. When the contact arm thereon engages one of the rings or the lugs thereon it is yieldingly held, even if further pressure is applied to the brake, and thus successively slips into the spaces between the lugs of the several rings in case they are not in alinement at the time of application of the brake. The first ring held applies a limited braking resistance and this may be graduated to a fine degree by successively engaging the rings.

The operation of the several parts of the mechanism will be obvious from the foregoing description and it will be seen that means are provided for an efficient control of the brakes upon all wheels when the vehicle is running at normal speed, while upon a reduction of the speed for stopping purposes the front wheel brakes are automatically released to prevent skidding and permit free steering. The brakes are adapted to be actuated by a single pedal and the connection of one set of rings with the wheel is effected as soon as the rotation of the wheel gains a driving speed while the braking rings are successively engaged by the yieldingly held actuator. The speed responsive device controlling the locking action of the brake to the wheel may be adjusted to effect its operation at any desired speed of wheel rotation. The invention presents a simple and efficient construction for the automatic control of a four wheel brake system.

While the specific construction of the several parts of the brake mechanism have been shown and described, still the invention is not confined thereto as changes and alterations may be made therein without departing from the spirit of the invention as recited in the following claims.

What I claim is—

1. A four wheel brake system embodying a manually operable braking member at each wheel, and speed responsive means for connecting and disconnecting the front wheel brakes therefrom.

2. A four wheel brake system embodying a manually operable braking member at each wheel, and speed responsive means for releasing the front wheel brakes when the speed of rotation of said wheels is below normal.

3. A four wheel brake system embodying a manually operable braking member at each wheel, and speed responsive means for releasing the front wheel brakes while the rear wheel brakes remain normally operable.

4. A four wheel brake system embodying a manually operable braking member at each wheel, and speed responsive means for releasing the front wheel brakes while the rear wheel brakes remain normally operable, and a unitary controlling means for simultaneously applying all of said brakes.

5. In a brake control, a wheel member, a brake member rotatable thereon in a plane parallel to the sides of the wheel, and speed responsive means mounted upon the wheel and having a contact member disposed to interlock with the brake member for automatically connecting and disconnecting the same from the wheel.

6. In a brake control, a wheel member, a friction brake member adapted to be releasably secured thereto, speed responsive means for automatically connecting and disconnecting said brake member, a cooperative friction brake member adapted to be rotated by the first mentioned brake member, and brake applying means operable to prevent rotation of said last mentioned brake member.

7. In brake control, a wheel member, a plurality of brake members adapted to be releasably secured thereto, and speed responsive means for automatically and successively connecting and disconnecting said brake members relative to the wheel.

8. In a brake control, a wheel member, a plurality of brake members adapted to be releasably secured thereto, speed responsive means for successively connecting and disconnecting said brake members relatively to the wheel, and manually operable means for graduating the application of the brake when the members are connected to the wheel.

9. In a brake control, a wheel member, brake members having peripheral seats and mounted thereon but disconnected therefrom when the wheel is at rest, and a centrifugally operable lever carrying a contact face to engage said seats when the wheel is under rotation.

10. In a brake control, a wheel member, contacting friction disks mounted thereon for rotation about the wheel axis when the wheel is at rest, a centrifugally operable lever upon the wheel carrying a contact face to engage one of the disks when the wheel is rotated, tension means for restoring said lever upon decrease of said rotation, and means for holding against rotation a co-operating disk.

11. In a brake control, a wheel member, a series of brake rings mounted thereon for independent movement, and speed responsive means carried upon the wheel and provided with a stepped contact face to successively engage said rings.

12. In a brake control, a wheel member, a series of brake rings mounted thereon for independent movement, a centrifugally operable lever pivoted upon the wheel, an arm pivoted to one end of said lever, and a contact face on said arm disposed to engage the periphery of said rings.

13. In a brake control, a wheel member, a series of brake rings mounted thereon for independent movement, a centrifugally operable lever pivoted upon the wheel, an arm pivoted to said lever and having a contact face to engage the periphery of said rings, and a tension spring extending from the weighted end of said lever to a fixed point upon the wheel.

14. In a brake control, a wheel member, a brake member carried thereby, lever pivoted upon a post upon said wheel and having a weighted end, a connector extending from said lever to engage said brake member, and an extension from said lever at its pivot provided with a lubricating channel communicating with an aperture in the wheel structure.

15. In a brake control, a wheel member, a plurality of friction rings mounted thereon for independent movement and provided with recesses at their periphery, an intermediate friction ring formed with seats at its inner periphery, a speed responsive device adapted to engage the recesses upon the first mentioned rings, and a brake actuator disposed to engage a seat upon the intermediate ring.

16. In a brake control, a wheel member, a plurality of friction rings mounted thereon for independent movement and provided with recesses at their periphery, an intermediate friction ring formed with seats at its inner periphery, a speed responsive device adapted to engage the recesses upon the first mentioned rings, and a brake actuator reciprocable diametrically of the rings to engage a seat upon the intermediate ring.

17. In a brake control, a wheel member, a series of friction rings mounted thereon for independent movement and formed with recesses at their outer periphery, an intermediate series of friction rings having inwardly projecting lugs of successively increasing length, a brake actuator disposed to engage said lugs to effect a graduated application of the brake, and speed responsive means disposed to engage the recesses upon the first mentioned rings.

18. In a brake control, a wheel member, a series of friction rings mounted thereon for independent movement and formed with recesses at their outer periphery, an intermediate series of friction rings, angle plates secured at the periphery of the first mentioned rings intermediate the recesses and bearing upon the outer periphery of the intermediate rings, speed responsive means to lock the first mentioned rings to the wheel, and a brake actuator disposed to engage the intermediate rings.

19. In a brake control, a wheel provided with a brake drum, a series of annular friction rings disposed therein for rotation independent of the wheel, a series of brake rings frictionally held for rotation with the first mentioned rings, speed responsive means for automatically connecting and disconnecting the friction rings with the wheel, and a brake actuator disposed to retain the brake rings against rotation with the friction rings.

20. In a brake control, a wheel provided with a brake drum, a series of annular friction rings disposed therein for rotation independent of the wheel, a series of intermediate brake rings frictionally held for rotation with the first mentioned rings, speed responsive means having a contact member to connect the friction rings with the wheel, and a brake actuator disposed to successively engage and retain the brake rings against rotation with the friction rings.

In testimony whereof I affix my signature.

WALTER J. SPIRO.